«12» United States Patent
Nakajima

«10» Patent No.: US 6,958,787 B2
«45» Date of Patent: Oct. 25, 2005

«54» LIQUID CRYSTAL DISPLAY DEVICE

«75» Inventor: Mutsumi Nakajima, Nara (JP)

«73» Assignee: Sharp Kabushiki Kaisha, Osaka (JP)

«*» Notice: Subject to any disclaimer, the term of this patent is extended or adjusted under 35 U.S.C. 154(b) by 274 days.

«21» Appl. No.: 09/993,898

«22» Filed: Nov. 27, 2001

«65» Prior Publication Data

US 2002/0063810 A1    May 30, 2002

«30» Foreign Application Priority Data

Nov. 27, 2000  (JP) ............................ 2000-359227
Sep. 14, 2001  (JP) ............................ 2001-279821

«51» Int. Cl.⁷ ......................................... G02F 1/1368
«52» U.S. Cl. ........................... 349/39; 349/43; 349/110
«58» Field of Search ............................ 349/38, 39, 43, 349/110, 111, 44; 257/59, 72; 345/92

«56» References Cited

U.S. PATENT DOCUMENTS 6,525,788 B1 *  2/2003  Nakagawa et al. ............ 349/44

FOREIGN PATENT DOCUMENTS

JP     10-339860 A    12/1998
JP     11-311805 A    11/1999

* cited by examiner

Primary Examiner—Dung T. Nguyen
Assistant Examiner—Tai Duong
«74» Attorney, Agent, or Firm—Nixon & Vanderhye P.C.

«57» ABSTRACT

A liquid crystal display apparatus has a plurality of TFTs and pixel electrodes disposed in a matrix form in regions surrounded with scanning lines and signal lines disposed on a glass substrate. The display apparatus also has an auxiliary capacitor electrode formed almost all over a display screen in such a way that the auxiliary capacitor electrode is opposed to the pixel electrodes with interposition of an insulation film therebetween. A slit is formed in the auxiliary capacitor electrode in a region corresponding to a gap between the adjacent pixel electrodes. Each pixel electrode may overlap the scanning lines and/or the signal lines. The width of the slit of the auxiliary capacitor electrode may be larger than the width of the gap between the adjacent pixel electrodes.

15 Claims, 6 Drawing Sheets

FIG. 11   PRIOR ART form and displays images by controlling voltages to be applied to the pixel electrodes through a plurality of switching elements connected to a plurality of scanning lines and a plurality of signal lines to thereby function as a shutter for adjusting light emitted from a light source such as a backlight. The liquid crystal display apparatus of this type has an advantage that it can display images with higher definition than a display apparatus such as a CRT (cathode ray tube), and is widely used for televisions, computers, information portable or mobile terminals, and the like.

LIQUID CRYSTAL DISPLAY DEVICE

BACKGROUND OF THE INVENTION

The present invention relates to a liquid crystal display apparatus of active matrix type.

There is known a liquid crystal display apparatus of a type that has a plurality of pixel electrodes arranged in a matrix form and displays images by controlling voltages to be applied to the pixel electrodes through a plurality of switching elements connected to a plurality of scanning lines and a plurality of signal lines to thereby function as a shutter for adjusting light emitted from a light source such as a backlight. The liquid crystal display apparatus of this type has an advantage that it can display images with higher definition than a display apparatus such as a CRT (cathode ray tube), and is widely used for televisions, computers, information portable or mobile terminals, and the like.

However, as the definition or resolution of images increases, it becomes increasingly difficult to allow the scanning lines, the signal lines, and the auxiliary capacitor electrode to have a fine structure respectively. Thus there will rise a problem that a light transmission area, namely, an aperture ratio decreases, which results in reduction of brightness. To solve the problem, various researches for increasing the aperture ratio have been made.

A liquid crystal display apparatus having an increased aperture ratio is disclosed in Japanese Patent Application Laid-Open No. 11-311805. The liquid crystal display apparatus has a construction in which an insulation film is sandwiched between two transparent conductive films to form an auxiliary capacitor. In the construction of the liquid crystal display apparatus, the opening through which light passes is not affected by the area of the auxiliary capacitor. Thus the auxiliary capacitance is sufficiently secured and at the same time, the aperture ratio is increased.

Figure 9:
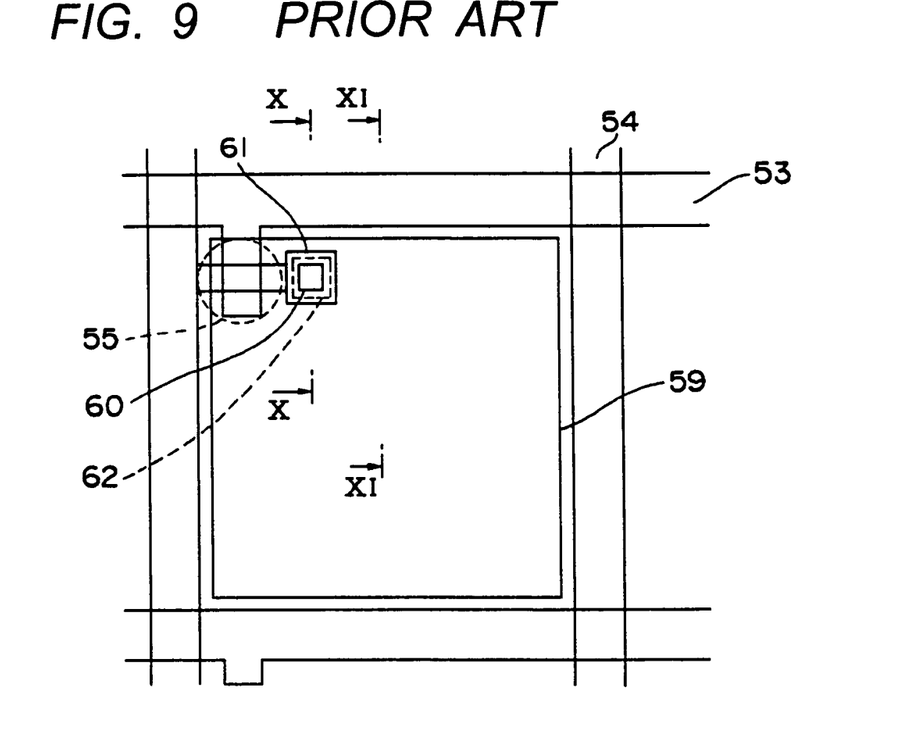
FIG. 9 is a plan view showing a prior art liquid crystal display apparatus.
Figure 10:
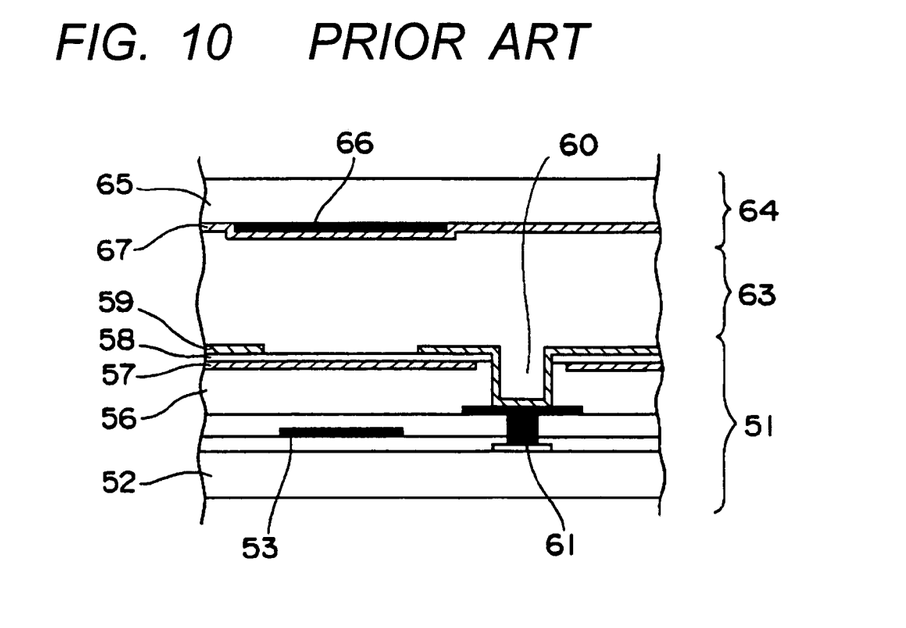
FIG. 10 is a sectional view taken along line X—X of FIG. 9.

FIG. 9 is plan view showing the construction of the above liquid crystal display apparatus. FIG. 10 is a sectional view taken along line X—X of FIG. 9. The construction of the liquid crystal display apparatus will be described below with reference FIGS. 9 and 10 in which only one pixel is shown for the sake of simplicity although there are multiplicity of pixels.

As shown in FIGS. 9 and 10, in a matrix board 51, a plurality of scanning lines 53 (only two of which are shown) and a plurality of signal lines 54 (only two of which are shown) are disposed on a glass substrate 52, and TFTs (thin film transistors) 55 (only one of which is shown) are formed at the intersection points of the scanning lines 53 and the signal lines 54. A planarization film 56 is formed in such a way as to cover the entire screen. Auxiliary capacitor electrodes 57, insulation films 58, and pixel electrodes 59 are sequentially formed over the planarization film 56. The planarization film 56, the auxiliary capacitor electrode 57, the insulation film 58, and the pixel electrode 59 are made of transparent materials respectively. Each pixel electrode 59 is connected to a drain electrode 61 through a throughhole 60. The auxiliary capacitor electrode 57 and the insulation film 58 have partially been removed in a predetermined pattern (shown with reference numeral 62 in FIG. 9) at the through-hole 60.

The planarization film 56 serves to improve the flatness of the pixel electrodes 59. In addition, the planarization film 56 is capable of insulating the signal lines 54 from the auxiliary capacitor electrodes 57. Therefore, the auxiliary capacitor electrode 57 can be formed all over the screen.

To prevent optical leak from the periphery of the pixel electrode 59, an opposed board 64 sandwiching a liquid crystal layer 63 between itself and the matrix board 51 has a light-shielding film 66 and an opposed electrode 67 made of a transparent conductive film on a glass substrate 65.

Because a transparent conductive film is used for the auxiliary capacitor electrode 57, the pixel electrode 59 other than a part shielded from light by the scanning line 53, the signal line 54, and the light-shielding film 66 serves as the opening of the pixel, and the auxiliary capacitor is formed to have an area almost the same as the area of the pixel electrode 59.

The above design of the liquid crystal display apparatus is intended to obtain a sufficient auxiliary capacitance and a high aperture ratio at the same time. However, the design invites the orientation disorder of the liquid crystal in the periphery of the pixel electrode, which causes conspicuous deterioration of the display quality.

Figure 11:
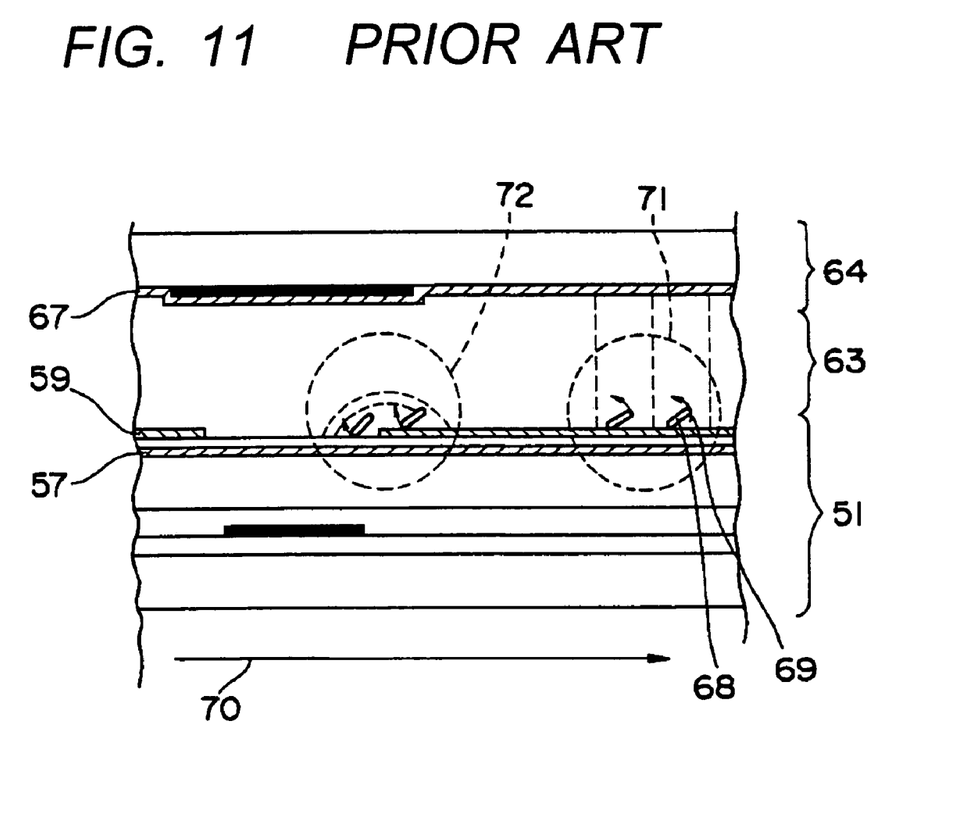
FIG. 11 is a sectional view taken along line XI—XI of FIG. 9.

FIG. 11 is a sectional view taken along line XI—XI of FIG. 9. The reason for the conspicuous deterioration of the display quality will be described below with reference to FIG. 11.

As shown in FIG. 11, an orientation film (not shown) is applied onto the inner side of each of the matrix board 51 and the opposed board 64. By carrying out rubbing treatment on the orientation film, liquid crystal molecules 68 of the liquid crystal layer 63 are oriented in almost parallel with each other and tilted at an equal angle. This angle is called a pre-tilt angle 69, at which the liquid crystal molecules are raised on a downstream side of the rubbing direction 70.

When the liquid crystal display apparatus displays an image, a voltage corresponding to a video signal is applied to the pixel electrodes 59. As a result, the liquid crystal molecules 68 are oriented in a direction along lines of electric force according to the pre-tilt angle 69, and an optical modulation is made according to a change of the orientation state thereof. To prevent a potential difference from being generated between the auxiliary capacitor electrode 57 and the opposed electrode 67, a voltage substantially equal to that applied to the opposed electrode 67 is applied to the auxiliary capacitor electrode 57.

At this time, an electric field is generated almost perpendicularly at the center 71 of the pixel electrode 59. Thus the orientations of the liquid crystal molecules 68 change uniformly at the center 71 of the pixel electrode 59. However, in the periphery of the pixel electrode 59, a strong transverse electric field (in FIG. 11, the direction of the electric field is shown with broken lines) is generated from the pixel electrode 59 to the auxiliary capacitor electrode 57. Therefore the orientations of the liquid crystal molecules 68 become non-uniform under the influence of the electric field. In an extreme case, when a voltage is applied, the rotational direction of the liquid crystal molecules 68 in the periphery 72 of the pixel electrode 59 becomes opposite to that of the liquid crystal molecules 68 at the center 71 of the pixel electrode 59 to generate a phenomenon called a "reverse tilt" (in FIG. 11, an estimated or presumed rotational direction of liquid crystal molecules is shown with arrows). In such a case, the orientation disorder reaches as far as an internal portion of the pixel electrode 59. Consequently optical leak is generated in the periphery of the pixel electrode 59, which deteriorates the display quality of the image greatly.

To prevent the influence of the orientation disorder, it is conceivable to light-shield the region in which the orientation disorder is generated, by increasing the width of the scanning line, the signal line, and the light-shielding film. However, such a method results in decrease of the aperture ratio. On the other hand, increase of the thickness of the auxiliary capacitor insulation film allows decrease of the influence of the electric field from the auxiliary capacitor electrode, but leads to decrease of the auxiliary capacitance. Therefore the auxiliary capacitance cannot be secured sufficiently.

SUMMARY OF THE INVENTION

Therefore, it is an object of the present invention to provide a liquid crystal display apparatus that allows a sufficient auxiliary capacitance and a high aperture ratio to be obtained at the same time, without causing deterioration of display quality even when the definition is increased.

In order to accomplish the above object, there is provided, according to an aspect of the present invention, a liquid crystal display apparatus comprising two boards between which a liquid crystal layer is sandwiched, one of the boards including:

a plurality of scanning lines;

a plurality of signal lines disposed so as to intersect the scanning lines;

a plurality of switching elements and a plurality of pixel electrodes disposed in a matrix form in regions surrounded with the scanning lines and the signal lines; and an auxiliary capacitor electrode formed almost all over a display screen in such a manner that the auxiliary capacitor electrode is opposed to the pixel electrodes, with an insulation film interposed therebetween, a region of the auxiliary capacitor electrode corresponding to a gap between the adjacent pixel electrodes having at least partially been removed.

With the arrangement, because a region of the auxiliary capacitor electrode corresponding to a gap between the adjacent pixel electrodes has at least partially been removed, it is possible to reduce the intensity of a transverse electric field from the pixel electrode toward the auxiliary capacitor electrode. Therefore, it is possible to reduce the orientation disorder of the liquid crystal layer generated in the periphery of the pixel electrode and obtain a sufficient auxiliary capacitance and a high aperture ratio at the same time, without causing deterioration of the display quality of the liquid crystal display apparatus.

There is provided, according to another aspect of the present invention, a liquid crystal display apparatus comprising two boards between which a liquid crystal layer is sandwiched, one of the boards including:

a plurality of scanning lines;

a plurality of signal lines disposed so as to intersect the scanning lines;

a plurality of switching elements and a plurality of pixel electrodes disposed in a matrix form in regions surrounded with the scanning lines and the signal lines; and a light-shielding film formed almost all over a display screen in such a manner that the light-shielding film is opposed to the pixel electrodes with an insulation film interposed therebetween, a region of the light-shielding film corresponding to a gap between the adjacent pixel electrodes having at least partially been removed.

With this arrangement, because a region of the light-shielding film corresponding to a gap between the adjacent pixel electrodes has at least partially been removed, it is possible to reduce the intensity of a transverse electric field from the pixel electrode toward the light-shielding film. Therefore, it is possible to reduce the orientation disorder of the liquid crystal layer generated in the periphery of the pixel electrode and obtain a sufficient auxiliary capacitance and a high aperture ratio at the same time, without causing deterioration of the display quality of the liquid crystal display apparatus.

There is also provided, according to still another aspect of the present invention, a liquid crystal display apparatus comprising two boards between which a liquid crystal layer is sandwiched, one of the boards including:

a plurality of scanning lines;

a plurality of signal lines disposed so as to intersect the scanning lines;

a plurality of switching elements and a plurality of pixel electrodes disposed in a matrix form in regions surrounded with the scanning lines and the signal lines; and a light-shielding film and an auxiliary capacitor electrode formed almost all over a display screen in such a manner that the auxiliary capacitor electrode and the auxiliary capacitor electrode are opposed to the pixel electrodes with an insulation film interposed therebetween, a region of the light-shielding film and of the auxiliary capacitor electrode corresponding to a gap between the adjacent pixel electrodes having at least partially been removed.

With this arrangement, because a region of the light-shielding film and of the auxiliary capacitor electrode corresponding to a gap between the adjacent pixel electrodes have at least partially been removed, it is possible to reduce the intensity of a transverse electric field from the pixel electrode toward the light-shielding film and the auxiliary capacitor electrode. Therefore, it is possible to reduce the orientation disorder of the liquid crystal layer generated in the periphery of the pixel electrode and obtain a sufficient auxiliary capacitance and a high aperture ratio at the same time, without causing deterioration of the display quality of the liquid crystal display apparatus.

The light-shielding film may be formed in such a way that the light-shielding film is at least partially laid over the scanning lines, the signal lines, and/or the switching elements.

When the light-shielding film shields regions of the switching elements, optical leak from the switching elements is prevented. When the light-shielding film shields regions of the scanning lines and/or the signal lines, optical leak generated from the vicinity of the scanning lines and/or the signal lines is prevented. The contrast is thereby improved. Thus the liquid crystal display apparatus is usable in an application, such as a projection system, in which light having a high intensity is incident.

The auxiliary capacitor electrode may be formed in such a way that the auxiliary capacitor electrode is at least partially laid over the scanning lines, the signal lines, and/or the switching elements, whereby a sufficient auxiliary capacitance is formed.

Also, the auxiliary capacitor electrode may be made of a light permeable material and disposed in at least one portion of an opening of each of pixels, whereby a sufficient auxiliary capacitance is formed.

The pixel electrodes may be formed in such a way that the pixel electrodes overlap the scanning lines and/or the signal lines. In the liquid crystal display apparatus with this arrangement, in addition to that there hardly occurs orientation disorder in the vicinity of the pixel electrode, light is intercepted in the periphery of each pixel by the overlap between the pixel electrodes and the scanning lines and/or the signal lines. Therefore even though the width of the overlap between the pixel electrode and the scanning line and/or signal line is small, the aperture ratio can be increased without deteriorating the display quality of the liquid crystal display apparatus.

When a width of the removed portion of the auxiliary capacitor electrode is larger than a width of the gap between the adjacent pixel electrodes, it is possible to dispose the auxiliary capacitor electrode inside of the pixel electrode, namely, within the region occupied by the pixel electrode. Therefore the pixel electrodes effectively shield the liquid crystal layer from electric field components generated in the auxiliary capacitor electrode. As a result, the display quality is prevented from deterioration.

Similarly, when a width of the removed portion of the light-shielding film is larger than a width of the gap between the adjacent pixel electrodes, it is possible to dispose the light-shielding film within the region occupied by the pixel electrode. Therefore the pixel electrodes effectively shield the liquid crystal layer from electric field components generated in the light-shielding film. As a result, the display quality is prevented from deterioration.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and therein.

DETAILED DESCRIPTION OF THE PREFERRED EMBODIMENTS (First Embodiment)

The liquid crystal display apparatus of the present invention will be described in detail below by way of examples.

Figure 1:
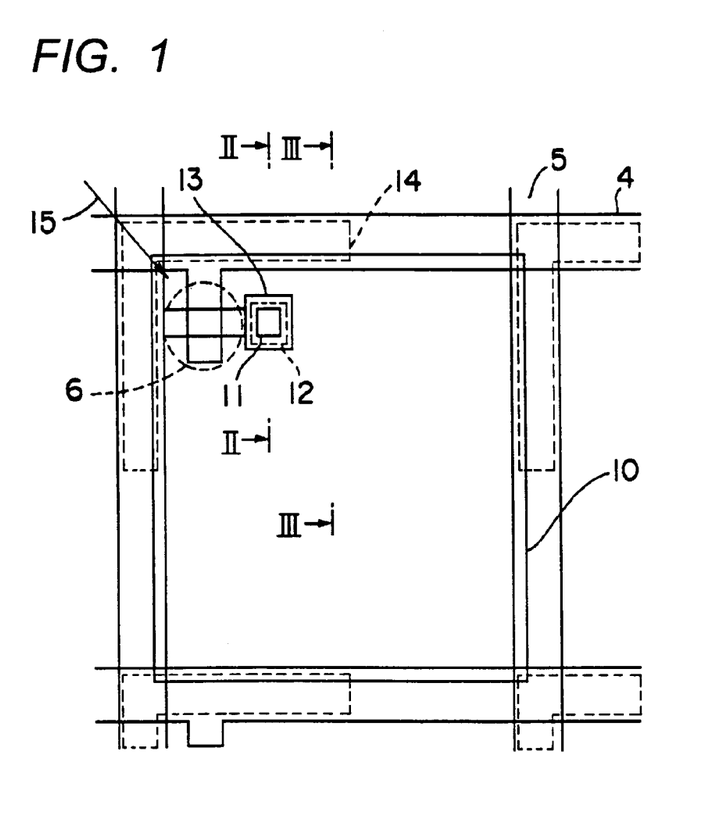
FIG. 1 is a plan view of a first embodiment of the liquid crystal display apparatus according to the present invention.
Figure 2:
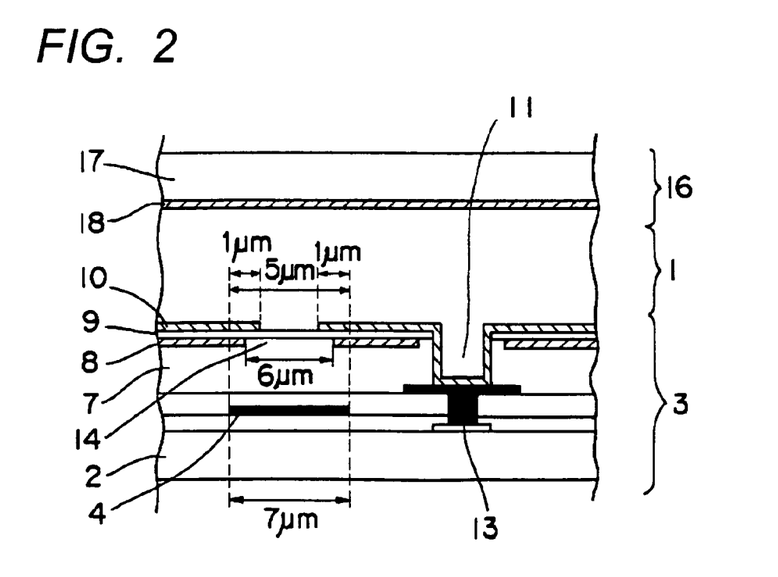
FIG. 2 is a sectional view taken along line II—II of FIG. 1, showing a positional relationship of parts in the first embodiment.

FIG. 1 is a plan view of a first embodiment of the liquid crystal display apparatus according to the present invention. FIG. 2 is a sectional view taken along line II—II of FIG. 1.

The liquid crystal display apparatus of the first embodiment has a matrix board 3, an opposed board 16, and a liquid crystal layer 1 sandwiched therebetween. In the matrix board 3, a plurality of parallel scanning lines 4 (only two of which are shown) and a plurality of parallel signal lines 5 (only two of which are shown) are disposed on a glass substrate 2 in such a way that the scanning lines 4 and the signal lines 5 intersect with each other at substantially right angles, and TFTs 6 (only one of which is shown) as switching elements are formed near the intersections of the scanning lines 4 and the signal lines 5. A metal material such as aluminum is used for the scanning lines 4 and the signal lines 5. The TFTs 6 are formed by a known technique.

A planarization film 7 is formed over the scanning lines 4 and the signal lines 5 formed in the shape of a lattice and the TFTs 6 in such a way as to cover the entire substrate. To improve the flatness of the planarization film 7, to secure its light transmission property, and to reduce its parasitic capacitance, a suitable material and a suitable film thickness are selected for the planarization film 7. In the first embodiment, to obtain a high degree of evenness and a thickness of the planarization film 7, a resinous material such as acrylic resin is used to form the planarization film 7 in a thickness of about 2 $\mu$m. An auxiliary capacitor electrode 8, an insulation film 9, and pixel electrodes 10 are sequentially formed on the planarization film 7.

The size of an auxiliary capacitance is determined by the area of overlapping between the auxiliary capacitor electrode 8 and the pixel electrode 10 and the material and thickness of the insulation film 9. To prevent deterioration of the display quality, such as display irregularity and crosstalk, it is preferable to set the auxiliary capacitance to a large value, but a thin insulation film 9 is liable to cause leakage defects. Thus it is necessary to select a suitable material for the insulation film 9 and suitably set its thickness in consideration of the insulation property and transmission property or permeability. In the first embodiment, an inorganic oxide such as $SiO_2$ or a resinous material such as acrylic resin is used to form the insulation film 9 in a thickness of about 0.1 $\mu$m. An ITO (indium-tin Oxide) film which is a transparent conductive film or the like is used to form the auxiliary capacitor electrode 8 and the pixel electrode 10. The auxiliary capacitor electrode 8 and the insulation film 9 have partially been removed in a predetermined pattern (see 12 in FIG. 1) at a through-hole 11. The pixel electrode 10 and a drain electrode 13 of the TFT 6 are connected to each other via the through-hole 11. Since the auxiliary capacitor electrode 8 in FIGS. 1–2 is formed over the pixel region with the exception of the relatively small areas 12 and 14 outlined in dashed lines, the auxiliary capacitor electrode 8 overlaps a majority portion of the pixel electrode 10 and is provided over a majority portion of the display screen.

The pixel electrode 10 is formed in such a way that it overlaps the adjacent scanning lines 4 and signal lines 5 to thereby secure a sufficient area of an opening through which light passes, without using a light-shielding film. In the first embodiment, a slit 14 is formed in a predetermined pattern in the auxiliary capacitor electrode 8 by removing a part of the auxiliary capacitor electrode 8 located above a scanning line 4 and a signal line 5 running along two adjoining sides of the pixel electrode 10 making a corner therebetween at a rubbing penetration side (FIG. 1 shows a direction 15 in which the rubbing treatment of matrix board 3 progresses.) of the matrix board 3.

Observing orientation disorder which occurs in a liquid crystal display apparatus having no slits in the auxiliary capacitor electrode, it has been found that the orientation disorder is most liable to occur in the neighborhood of the corner of each pixel electrode of the matrix board 3 at its rubbing penetration side. The present invention is intended to take an effective measure against such an orientation disorder.

It is preferable that the scanning line 4 and the signal line 5 have a smallest possible width to increase the aperture ratio. But the scanning line 4 and the signal line 5 too narrow will exhibit a high resistance and affect patterning precision adversely. Thus in the first embodiment, the width of the scanning line 4 and that of the signal line 5 are set to about 7 μm. The gap between the adjacent pixel electrodes 10 is set to about 5 μm. The width of the overlap between the pixel electrode 10 and each of the scanning line 4 and the signal line 5 is set to about 1 μm. The width of each slit 14 of the auxiliary capacitor electrode 8 is set to about 6 μm so as to be wider than the gap between the adjacent pixel electrodes 10. The thickness of the liquid crystal layer 1 is set to about 4 μm.

The opposed board 16 has an opposed electrode 18 formed of a transparent conductive film on a glass substrate 17 thereof.

Figure 3:
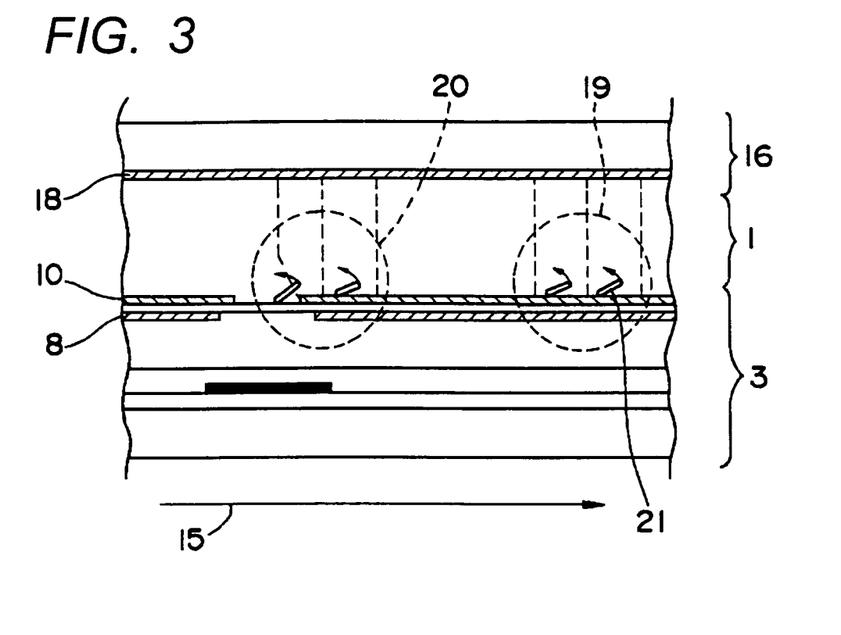
FIG. 3 is a sectional view taken along line III—III of FIG. 1.

The electric fields exerted upon the liquid crystal layer in the first embodiment will be described below. FIG. 3 shows a section of the liquid crystal display apparatus taken along line III—III of FIG. 1.

As shown in FIG. 3, in a central portion 19 of the pixel electrode 10, an electric field is formed in a direction perpendicular to the pixel electrode 10 and to the opposed electrode 18 (the direction of the electric field is shown with broken lines in FIG. 3). Although distortion of the electric field is generated at an end 20 of the pixel electrode 10, in the first embodiment, the intensity of the transverse electric field exerted from the auxiliary capacitor electrode 8 to the pixel electrode 10 is much reduced as compared with the prior art because the auxiliary capacitor electrode 8 has been removed from the area corresponding to the gap between the pixel electrodes 10. Consequently, liquid crystal molecules 21 of the liquid crystal layer 1 do not generate the orientation disorder in the center portion 19 of the pixel electrode 10 and even the end 20 of the pixel electrode 10 (FIG. 3 shows estimated rotational directions of liquid crystal molecules with arrows).

To reduce the intensity of the transverse electric field, it is preferable to make the width of the slit of the auxiliary capacitor electrode 8 larger than the gap between the pixel electrodes 10 in such a way that an edge of the auxiliary capacitor electrode 8 is disposed inside of the periphery of the pixel electrode 10. But if the width of the slit of the auxiliary capacitor electrode 8 is too large, the area of overlap between the pixel electrode 10 and the auxiliary capacitor electrode 8 is small. Consequently the auxiliary capacitance decreases. Therefore it is preferable to optimize the silt width of the auxiliary capacitor electrode 8 within the range in which the orientation disorder of the liquid crystal can be prevented. Even though the slit width of the auxiliary capacitor electrode 8 is small relative to the size of the gap between the pixel electrodes 10, the effect of reducing the intensity of the electric field can be obtained.

To prevent the influence of the electric field from the scanning line to the greatest possible degree, it is preferable that the thickness of the planarization film is large. Therefore the thickness of the planarization film should be optimized within the range in which the orientation disorder of the liquid crystal can be prevented without losing the auxiliary capacitance.

(Second Embodiment)

Figure 4:
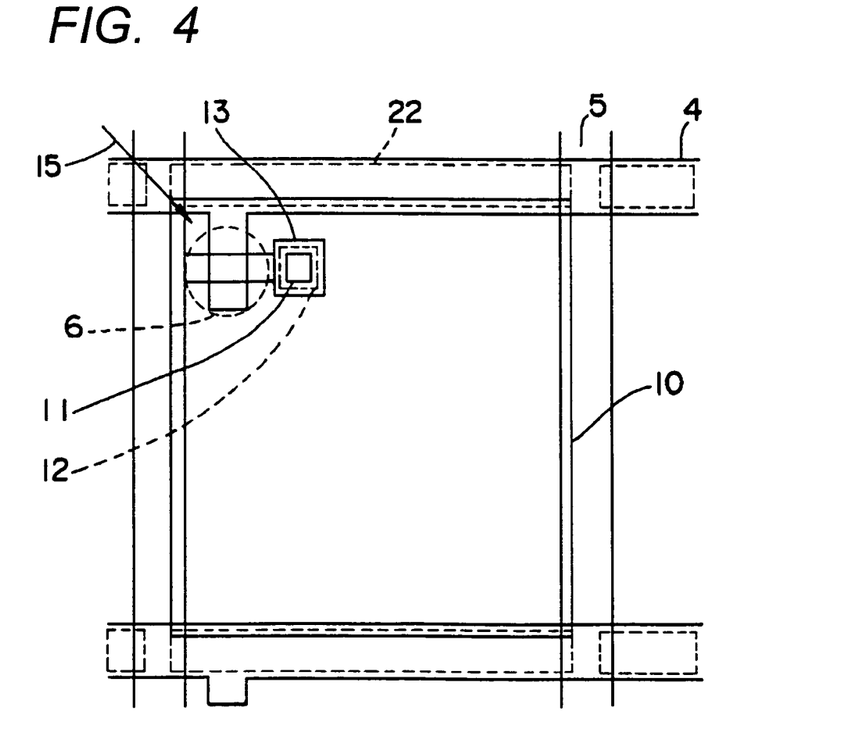
FIG. 4 is a plan view of a second embodiment of the liquid crystal display apparatus according to the present invention.

FIG. 4 is a plan view showing a second embodiment of the liquid crystal display apparatus according to the present invention. The liquid crystal display apparatus of the second embodiment has a sectional view similar to that of the liquid crystal display apparatus of the first embodiment. The liquid crystal display apparatus of the second embodiment is different from the first embodiment in that slits 22 of the auxiliary capacitor electrode are formed along scanning lines 4. Constituent parts of the liquid crystal display apparatus of the second embodiment same as the constituent parts of the first embodiment are denoted by the same reference numerals and the description thereof is omitted herein.

Because the liquid crystal display apparatus is driven by using alternating current, various driving methods are available with respect to reversing the polarity of a signal voltage. The second embodiment employs a driving method by which the polarity of the signal voltage is reversed every scanning line. Observing an orientation disorder in the periphery of pixel electrodes of liquid crystal display apparatuses that are driven by this driving method, it has been found that the orientation disorder occurs outstandingly in the neighborhood at the scanning line side of the pixel electrode. It has been also found that the construction having the slits 22 formed along the scanning lines 4 is particularly effective for such a driving method.

As described above, the position where the orientation disorder is likely to occur depends on the rubbing direction of the matrix board and the method of reversing the voltage polarity of video signals. Thus it is important to form the slits of the auxiliary capacitor electrode in regions where the orientation disorder is most likely to occur. For example, in the driving method of inverting the polarity of the signal voltage every signal line, the orientation disorder is liable to occur in the periphery of the pixel electrode along the signal line. In this case, it may be advisable to also make a slit in the auxiliary capacitor electrode near the signal line by removing a part of the auxiliary capacitor electrode in a predetermined pattern. Anyway, it is important to form slits of the auxiliary capacitor electrode in regions where the orientation disorder is most likely to occur for each case.

Providing the auxiliary capacitor electrode with slits makes it possible to decrease the intensity of the transverse electric field in the periphery of the pixel electrode. Thus the disposition and configuration of the slits relative to the rubbing direction and the driving direction may be changed from that of the liquid crystal display apparatus of the second embodiment.

(Third Embodiment)

Figure 5:
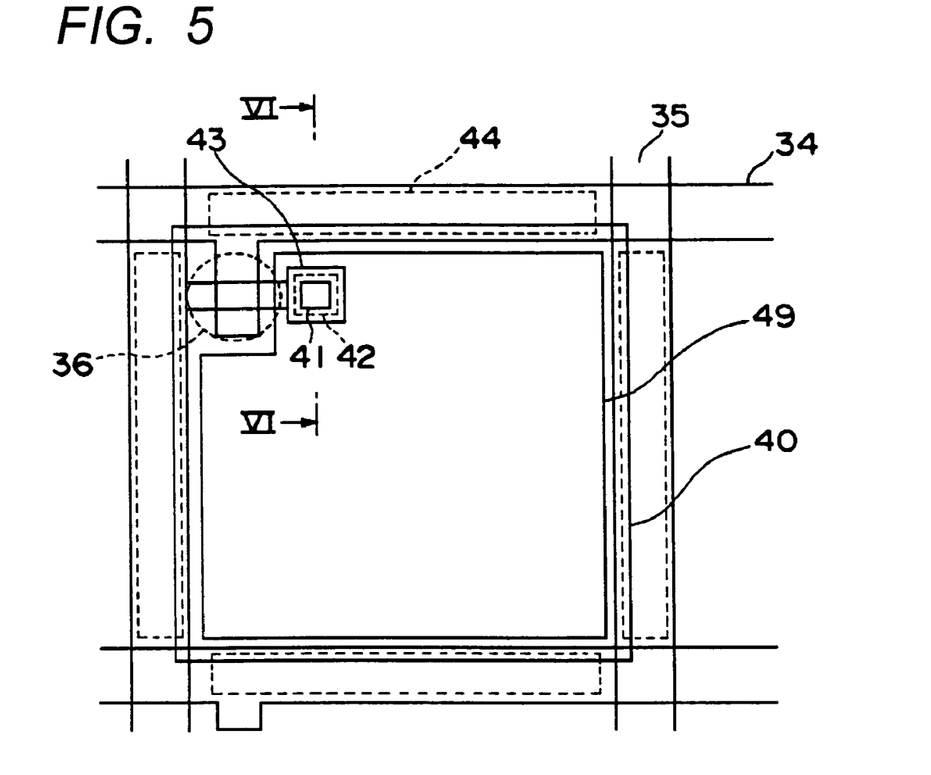
FIG. 5 is a plan view of a third embodiment of the liquid crystal display apparatus according to the present invention.
Figure 6:
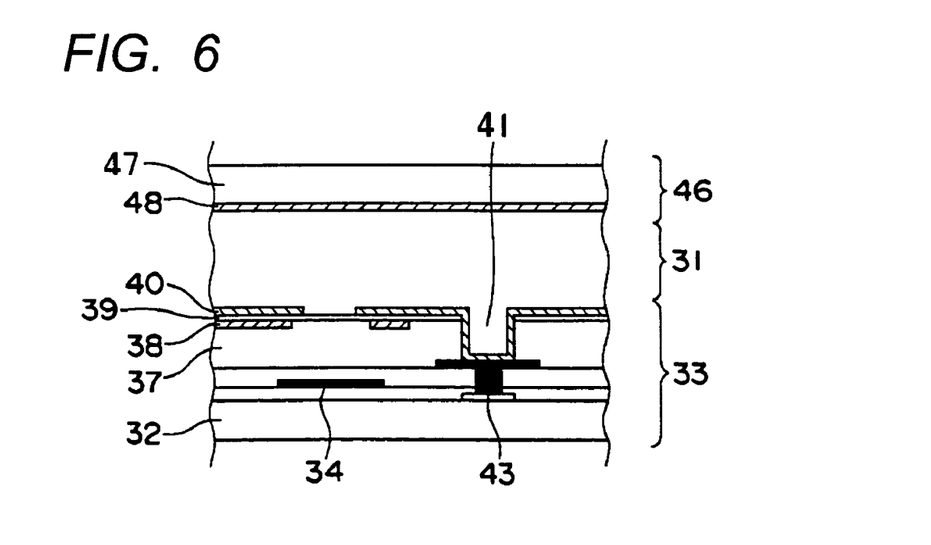
FIG. 6 is a sectional view taken along line VI—VI of FIG. 5.

FIG. 5 is a plan view showing a third embodiment of the liquid crystal display apparatus according to the present invention. FIG. 6 is a sectional view taken along line VI—VI of FIG. 5.

As shown in FIGS. 5 and 6, the liquid crystal display apparatus of the third embodiment has a matrix board 33 and an opposed board 46 between which a liquid crystal layer 31 is sandwiched. In the matrix board 33, a plurality of parallel scanning lines 34 (only two of which are shown) and a plurality of parallel signal lines 35 (only two of which are shown) are disposed on a glass substrate 32 in such a way that the scanning lines 34 and the signal lines 35 intersect each other at approximately right angles, and TFTs 36 (only one of which is shown) are formed near the intersections of the scanning lines 34 and the signal lines 35.

A planarization film 37 is formed over the scanning lines 34 and the signal lines 35, formed in the shape of a lattice, and over the TFTs 36 in such a way that the planarization film 37 covers the entire matrix board 33. A light-shielding film 38, an insulation film 39, and pixel electrodes 40 are sequentially formed on the planarization film 37.

The liquid crystal display apparatus of the third embodiment is different from the first embodiment in that the light-shielding film 38 made of a lightproof material also serves as an auxiliary capacitor electrode. The light-shielding film 38 is made of a metal material such as aluminum. The construction of the third embodiment eliminates the need for making a fine structure for electric wires dedicated to the auxiliary capacitor electrode and is thus suitable as the design for higher definition of images.

The size of the auxiliary capacitance is determined by an area of overlap or coincide of the light-shielding film 38 with a pixel electrode 40 and the material and thickness of the insulation film 39. An ITO film or the like which is a transparent conductive film is used to form the pixel electrode 40.

The light-shielding film 38 has been patterned by removing a portion inside of the pixel electrode 40 and the TFT 36, namely a portion within an area defined by the edges of the pixel electrode but excluding the TFT area, which portion serves as an opening 49 of a pixel through which light passes. The light-shielding film 38 intercepts light from the region of the TFT 36 to thereby reduce optical leak that occurs at the TFT 36. The light-shielding film 38 also reduces optical leak that occurs in the vicinity of the scanning lines 34 and the signal lines 35 and is thus capable of improving the contrast. Thus the design using the light-shielding film 38 is applicable to a projection display where light having a high intensity is incident.

Part of the insulation film 39 has been removed in a predetermined pattern (see 42 of FIG. 5) at a through-hole 41 through which the pixel electrode 40 and a drain electrode 43 of the TFT 36 are connected to each other.

The pixel electrode 40 is formed in such a way that the pixel electrode 40 overlaps the adjacent scanning lines 34 and signal lines 35. In the third embodiment, the light-shielding film 38 has rectangular slits 44 formed in a predetermined pattern along the four sides of the pixel electrode 40 and above the scanning lines 34 and the signal lines 35 except for regions of intersection of the scanning lines 34 and the signal lines 35. In spite of the existence of the slits 94 for each pixel, the entire light-shielding film 38 is electrically conductive.

The opposed board 46 has an opposed electrode 48 composed of a transparent conductive film on a glass substrate 47 thereof.

In the third embodiment, the light-shielding film 38 is intended for use as an auxiliary capacitor electrode as well. But the light-shielding film 38 may be formed for only light shielding purposes. For example, the light-shielding film 38 may be a black matrix. The configuration of the light-shielding film 38 may be changed in accordance with applications. For example, the light-shielding film 38 may be so shaped as to shield only scanning line regions, only signal line regions, or only TFT regions.

The slits 44 have an effect of preventing the orientation disorder, similar to the slits of the auxiliary capacitor electrode in the first and second embodiments. The shape of the slits may be appropriately altered in consideration of the influence of the slit on the orientation state of the liquid crystal. Thus the slits of the third embodiment may have shapes different from the shown shape.

(Fourth Embodiment)

Figure 7:
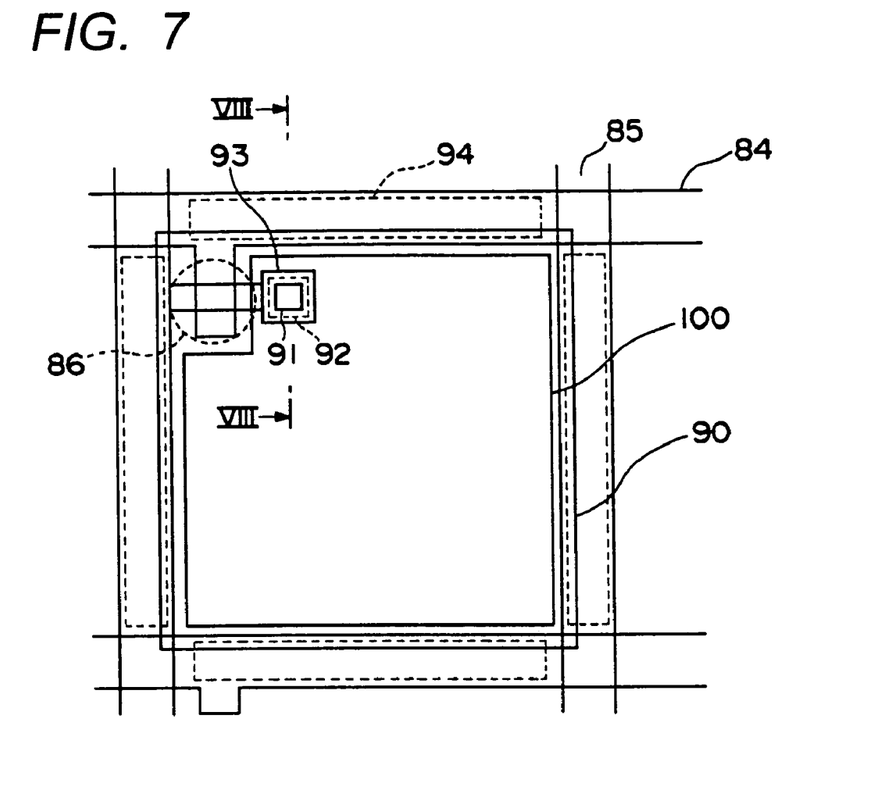
FIG. 7 is a plan view of a fourth embodiment of the liquid crystal display apparatus according to the present invention.
Figure 8:
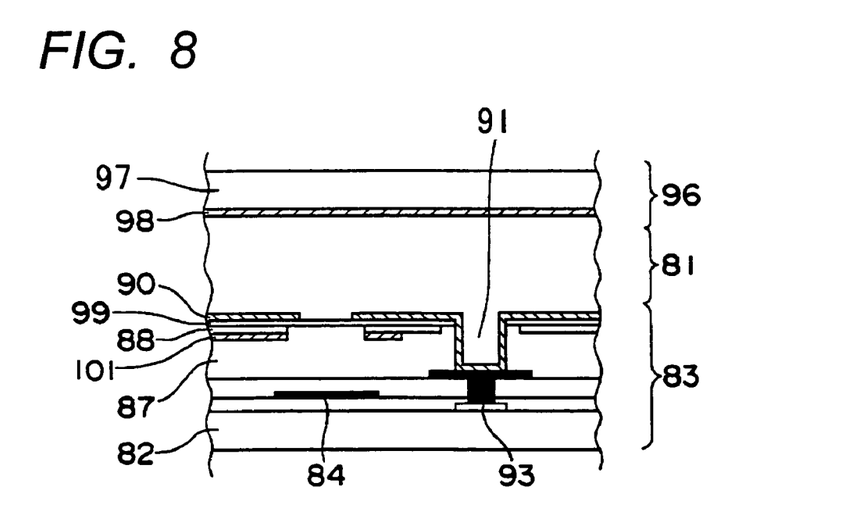
FIG. 8 is a sectional view taken along line VIII—VIII of FIG. 7.

FIG. 7 is a plan view of a fourth embodiment of the liquid crystal display apparatus according to the present invention. FIG. 8 is a sectional view taken along line VIII—VIII of FIG. 7.

As shown in FIGS. 7 and 8, the liquid crystal display apparatus of the fourth embodiment has a matrix board 83 and an opposed board 96 between which a liquid crystal layer 81 is sandwiched. In the matrix board 83, a plurality of parallel scanning lines 84 (only two of which are shown) and a plurality of parallel signal lines 85 (only two of which are shown) are disposed on a glass substrate 82 in such a way that the scanning lines 84 and the signal lines 85 intersect with each other, and TFTs 86 (only one of which is shown) are formed near the intersections of the scanning lines 84 and the signal lines 85.

A planarization film 87 is formed over the scanning lines 84 and the signal lines 85 formed in the shape of a lattice and over the TFTs 86 in such a way that the planarization film 87 covers the entire matrix board 83. A light-shielding film 101, an auxiliary capacitor electrode 88, an insulation film 99, and pixel electrodes 90 are sequentially formed on the planarization film 87.

The liquid crystal display apparatus of the fourth embodiment is different from the third embodiment in that the light-shielding film 101 made of a lightproof material is covered by an auxiliary capacitor electrode 88 made of a transparent conductive film. The light-shielding film 101 has partially been removed in a predetermined pattern in a region inward of the pixel electrode 90 that does not include a TFT 93 region. The auxiliary capacitor electrode 88 made of the transparent conductive film is formed on almost the entire surface of the board or display screen including openings 100 of the pixels.

The value of the auxiliary capacitance is determined by the area of overlap or coincide between the auxiliary capacitor electrode 88 and the pixel electrode 90 and the material and thickness of the insulation film 99. ITO which is a transparent conductive material or the like is used to form the auxiliary capacitor electrode 88 and the pixel electrode 90. The auxiliary capacitor electrode 88 and the insulation film 99 have been removed (see 92 in FIG. 7) in a predetermined pattern at a through-hole 91 via which the pixel electrode 90 and a drain electrode 43 of the TFT 86 is connected to each other.

The pixel electrode 90 is formed in such a way that the pixel electrode 90 overlaps the scanning lines 84 and the signal lines 85. In the fourth embodiment, the light-shielding film 101 and the auxiliary capacitor electrode 88 have their respective rectangular slits 94 formed in a predetermined pattern along the four sides of the pixel electrode 90 and above the scanning lines 84 and the signal lines 85 except for regions of intersection of the scanning lines 84 and the signal lines 85. In spite of the existence of the slits 94 for each pixel, the entire auxiliary capacitor electrode 88 is electrically conductive.

The opposed board 96 has an opposed electrode 98 formed of a transparent conductive film on a glass substrate 97 thereof.

In the fourth embodiment, because the auxiliary capacitance is determined by the area of overlap between the auxiliary capacitor electrode 88 and the pixel electrode 90, it is possible to increase the auxiliary capacitance irrespective of the size of the opening 100 and also form the light-shielding film 101 in a minimum necessary region to be shielded. Thus it is possible to increase the auxiliary capacitance and the aperture ratio at the same time.

The configuration of the light-shielding film may be changed from that of the fourth embodiment. For example, the light-shielding film may be so shaped as to shield only scanning line regions, only signal line regions or only TFT regions.

The slits 94 have an effect of preventing the orientation disorder, similar to the slits in the first to third embodiments. The configuration of the slits may be appropriately selected in consideration of the influence of the slits on the orientation state of the liquid crystal. Thus the slits of the fourth embodiment may be modified to have different configurations.

In the first, second, third, and fourth embodiments, the liquid crystal display apparatuses of transmission type have been described. But the present invention is applicable to a liquid crystal display apparatus of other types such as reflection type and irrespective of the construction of switching elements.

As apparent from the foregoing description, according to the present invention, it is possible to greatly reduce the transverse electric field in the periphery of the pixel electrodes and thus prevent the orientation disorder of the liquid crystal layer. Therefore, it is possible to obtain a liquid crystal display apparatus having a sufficient auxiliary capacitance and a high aperture ratio and hence a high display quality even though a high-definition image is displayed. Further the present invention achieves superior display performance with a high contrast even in an application where light having a high intensity is used, such as in a projection display system or the like.

It is known that the easiness of the generation of the orientation disorder of the liquid crystal layer is different according to a pre-tilt angle, namely an angle of a liquid crystal molecule in a voltage-unapplied state with respect to the surface of an orientation film, and an orientation suppressing force. It is important to improve those characteristics of materials of the liquid crystal and the orientation film. In addition, the materials for the liquid crystal and the orientation film are required to satisfy various additional requirements such as a voltage-holding characteristic, a refractive index, a dielectric constant, an elastic constant, a transition temperature, and the like. These requirements have made it difficult to develop preferable materials for the liquid crystal and the orientation film.

However, by applying the present invention to liquid crystal display apparatuses, it becomes possible to widen the degree of freedom in selecting materials for the liquid crystal and the orientation film and thus easily improve performance in terms of a response speed, reliability, and the like which are generally required of the liquid crystal display apparatuses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display apparatus comprising two boards between which a liquid crystal layer is sandwiched, one of the boards including:
   a plurality of scanning lines;
   a plurality of signal lines disposed so as to intersect the scanning lines;
   a plurality of switching elements and a plurality of pixel electrodes disposed in a matrix form in regions surrounded with the scanning lines and the signal lines; and
   an auxiliary capacitor electrode formed over a majority portion of a display screen in such a manner that the auxiliary capacitor electrode is opposed to and overlaps a majority portion of each of a plurality of the pixel electrodes, with an insulation film interposed therebetween,
   a region of the auxiliary capacitor electrode corresponding to a gap between adjacent pixel electrodes having at least partially been removed.

2. The liquid crystal display apparatus according to claim 1, wherein the auxiliary capacitor electrode is at least partially laid over the scanning lines, the signal lines, and/or the switching elements.

3. The liquid crystal display apparatus according to claim 1, wherein the pixel electrodes overlap the scanning lines and/or the signal lines.

4. A liquid crystal display apparatus comprising two boards between which a liquid crystal layer is sandwiched, one of the boards including:
   a plurality of scanning lines;
   a plurality of signal lines disposed so as to intersect the scanning lines;
   a plurality of switching elements and a plurality of pixel electrodes disposed in a matrix form in regions surrounded with the scanning lines and the signal lines;
   an auxiliary capacitor electrode formed over a majority portion of a display screen in such a manner that the auxiliary capacitor electrode is opposed to a plurality of the pixel electrodes, with an insulation film interposed therebetween;
   a region of the auxiliary capacitor electrode corresponding to a gap between adjacent pixel electrodes having at least partially been removed; and
   wherein the auxiliary capacitor electrode is made of a light permeable material and disposed in at least one portion of an opening of each of pixels.

5. A liquid crystal display apparatus comprising two boards between which a liquid crystal layer is sandwiched, one of the boards including:
   a plurality of scanning lines;
   a plurality of signal lines disposed so as to intersect the scanning lines;
   a plurality of switching elements and a plurality of pixel electrodes disposed in a matrix form in regions surrounded with the scanning lines and the signal lines;
   an auxiliary capacitor electrode formed over a majority portion of a display screen in such a manner that the auxiliary capacitor electrode is opposed to a plurality of the pixel electrodes, with an insulation film interposed therebetween;
   a region of the auxiliary capacitor electrode corresponding to a gap between adjacent pixel electrodes having at least partially been removed; and
   wherein a width of an area where the auxiliary capacitor electrode has been removed is larger than a width of the gap between the adjacent pixel electrodes.

6. A liquid crystal display apparatus comprising two boards between which a liquid crystal layer is sandwiched, one of the boards including:
   a plurality of scanning lines;
   a plurality of signal lines disposed so as to intersect the scanning lines;

a plurality of switching elements and a plurality of pixel electrodes disposed in a matrix form in regions surrounded with the scanning lines and the signal lines;

a light-shielding film formed in such a manner that the light-shielding film is opposed to a plurality of the pixel electrodes with an insulation film interposed therebetween, a region of the light-shielding film corresponding to a gap between adjacent pixel electrodes having at least partially been removed, and wherein a width of an area where the light-shielding film has been removed is larger than a width of the gap between the adjacent pixel electrodes.

7. The liquid crystal display apparatus according to claim 6, wherein the light-shielding film is at least partially laid over the scanning lines, the signal lines, and/or the switching elements.

8. The liquid crystal display apparatus according to claim 6, wherein the pixel electrodes overlap the scanning lines and/or the signal lines.

9. A liquid crystal display apparatus comprising two boards between which a liquid crystal layer is sandwiched, one of the boards including:

a plurality of scanning lines;

a plurality of signal lines disposed so as to intersect the scanning lines;

a plurality of switching elements and a plurality of pixel electrodes disposed in a matrix form in regions surrounded with the scanning lines and the signal lines;

an auxiliary capacitor electrode formed over a majority portion of a display screen in such a manner that the auxiliary capacitor electrode is opposed to a plurality of the pixel electrodes with an insulation film interposed therebetween;

a light-shielding film formed in such a manner that the light-shielding film is opposed to a plurality of the pixel electrodes with the insulation film therebetween; and regions of each of the light-shielding film and the auxiliary capacitor electrode corresponding to a gap between adjacent pixel electrodes having at least partially been removed.

10. The liquid crystal display apparatus according to claim 9, wherein the light-shielding film is at least partially laid over the scanning lines, the signal lines, and/or the switching elements.

11. The liquid crystal display apparatus according to claim 9, wherein the auxiliary capacitor electrode is at least partially laid over the scanning lines, the signal lines, and/or the switching elements.

12. The liquid crystal display apparatus according to claim 9, wherein the auxiliary capacitor electrode is made of a light permeable material and disposed in at least one portion of an opening of each of pixels.

13. The liquid crystal display apparatus according to claim 9, wherein the pixel electrodes overlap the scanning lines and/or the signal lines.

14. The liquid crystal display apparatus according to claim 9, wherein a width of an area where the auxiliary capacitor electrode has been removed is larger than a width of the gap between the adjacent pixel electrodes.

15. The liquid crystal display apparatus according to claim 9, wherein a width of an area where the light-shielding film has been removed is larger than a width of the gap between the adjacent pixel electrodes.

* * * * *